(12) United States Patent
Ayers

(10) Patent No.: US 7,415,452 B1
(45) Date of Patent: Aug. 19, 2008

(54) TRAVERSING A HIERARCHICAL LAYOUT TEMPLATE

(75) Inventor: Robert M. Ayers, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 970 days.

(21) Appl. No.: 10/177,576

(22) Filed: Jun. 21, 2002

(51) Int. Cl.
G06F 7/00 (2006.01)
(52) U.S. Cl. .............................................. 707/2; 707/1
(58) Field of Classification Search .......... 707/1–104.1, 707/200; 709/204; 345/854
See application file for complete search history.

(56) References Cited

U.S. PATENT DOCUMENTS

| | | | |
|---|---|---|---|
| 4,723,209 A | 2/1988 | Hernandez et al. | |
| 5,031,121 A | 7/1991 | Iwai et al. | |
| 5,164,899 A | 11/1992 | Sobotka et al. | |
| 5,214,755 A | 5/1993 | Mason | |
| 5,323,312 A * | 6/1994 | Saito et al. .................. | 715/513 |
| 5,379,373 A * | 1/1995 | Hayashi et al. ............. | 715/513 |
| 5,467,448 A | 11/1995 | Hilton et al. | |
| 5,633,996 A | 5/1997 | Hayashi et al. | |
| 5,742,837 A | 4/1998 | Fukui et al. | |
| 5,819,300 A | 10/1998 | Kohno et al. | |
| 5,845,303 A | 12/1998 | Templeman | |
| 5,873,106 A | 2/1999 | Joshy | |
| 5,893,127 A | 4/1999 | Tyan et al. | |
| 5,978,819 A | 11/1999 | Berstis | |
| 6,084,595 A * | 7/2000 | Bach et al. .................. | 345/589 |
| 6,137,488 A | 10/2000 | Kraft et al. | |
| 6,266,684 B1 | 7/2001 | Kraus et al. | |
| 6,288,719 B1 | 9/2001 | Squilla et al. ............... | 715/805 |
| 6,324,555 B1 | 11/2001 | Sites | |
| 6,326,970 B1 | 12/2001 | Mott et al. | |
| 6,542,629 B1 | 4/2003 | Wu et al. | |
| 6,583,800 B1 * | 6/2003 | Ridgley et al. .............. | 345/854 |
| 6,596,032 B2 | 7/2003 | Nojima et al. | |
| 6,606,105 B1 * | 8/2003 | Quartetti ..................... | 345/853 |
| 6,620,206 B1 | 9/2003 | Seaman et al. | |

(Continued)

OTHER PUBLICATIONS

Xerox Corporation, "Interscript—A standard for the Interchange of Editable Documents", Version 2.0, Sep. 1983.*

(Continued)

*Primary Examiner*—Don Wong
*Assistant Examiner*—Linh Black
(74) *Attorney, Agent, or Firm*—Fish & Richardson P.C.

(57) ABSTRACT

Methods and apparatus implementing systems and techniques for traversing a hierarchical layout template to accelerate a constraint-driven backtracking search for a solution of the layout template. In general, in one implementation, the techniques include identifying a shared content element constraint that defines a content requirement common to all layout structures possible in a choice substructure in a hierarchical layout template, and associating the shared content element constraint with a root node of the choice substructure in the hierarchical layout template. In another aspect, the techniques include receiving content elements to be presented according to a hierarchical layout template that includes a choice substructure including a root node having a shared content element constraint that defines a content requirement common to all layout structures possible in the choice substructure, and traversing the hierarchical layout template to generate a layout structure that accommodates the content elements, said traversing including traversing the hierarchical layout template based at least in part on the shared content element constraint associated with the root node.

33 Claims, 4 Drawing Sheets

U.S. PATENT DOCUMENTS

| | | | |
|---|---|---|---|
| 6,626,958 | B1 | 9/2003 | McCauley et al. |
| 6,636,648 | B2 | 10/2003 | Loui et al. |
| 6,636,849 | B1 * | 10/2003 | Tang et al. ..................... 707/6 |
| 6,643,652 | B2 * | 11/2003 | Helgeson et al. .............. 707/10 |
| 6,654,734 | B1 * | 11/2003 | Mani et al. ..................... 707/2 |
| 6,687,876 | B1 | 2/2004 | Schillit et al. |
| 6,766,362 | B1 | 7/2004 | Miyasaka et al. |
| 6,813,746 | B1 | 11/2004 | O'Shea |
| 6,826,727 | B1 * | 11/2004 | Mohr et al. ................. 715/517 |
| 6,877,135 | B1 | 4/2005 | Kamiwada et al. |
| 6,915,484 | B1 | 7/2005 | Ayers et al. |
| 2002/0004805 | A1 * | 1/2002 | Nojima et al. .............. 707/520 |
| 2002/0021308 | A1 | 2/2002 | White et al. |
| 2003/0135520 | A1 * | 7/2003 | Mitchell et al. ............ 707/200 |
| 2003/0158897 | A1 * | 8/2003 | Ben-Natan et al. .......... 709/204 |
| 2003/0169926 | A1 * | 9/2003 | Sonmez et al. .............. 382/219 |
| 2003/0227487 | A1 * | 12/2003 | Hugh ........................ 345/777 |
| 2005/0223320 | A1 * | 10/2005 | Brintzenhofe et al. ....... 715/517 |

OTHER PUBLICATIONS

Lam et al., "Frame-Based Knowledge Representation for Multi-domain Document Layout Analysis", IEEE, 1999, pp. 1859-1864.*

Interscript, "A Standard for the Interchange of Editable Documents," Version 2.0, Sep. 1983.

Paul Haley, "Data-Driven Backward Chaining," Published in the Proceedings of the Second Annual CLIPS Conference, NASA Johnson Space Center, Houston, TX, Sep. 1991, pp. 1-4.

Interscript—"Document Description Language," p. 1-29, www.acii.com/isc.htm, Mar. 13, 2002.

Lynda Hardman, et al., "Towards Multimedia on the Semantic Web," www.cwi.ni/ins2/, pp. 1-8.

Rogelio Adobbati, et al., "Automatic Generation of Visual Presentations for Software Understanding," www.isi.edu/isd/media-doc/CCS98.html, Mar. 13, 2002, pp. 1-13.

Microsoft PowerPoint 2000, Copyright 1987-1999 Microsoft Corporation, referred as PowerPoint, screenshots, pp. 1-7.

BCL's SimplEBook Opens ebooks to the Web, Jul. 25, 2000, Business Wire, pp. 1-2.

Magellan 4.2 User Manual, 2000, BCL Computers.

Sears, AIDE: A step toward metric-based interface development tools, ACM 1995, pp. 101-110.

Peels et al., Document Architecture and Text Formatting, ACM 1985, pp. 374-369.

U.S. Appl. No. 09/635,999, filed Aug. 9, 2000, "Text Reflow in a Structured Document".

U.S. Appl. No. 09/639,582, filed Aug. 14, 2000, "Self Sizing Object Placement".

Hurst, et al. "Layout and Language: Integrating Spatial and Linguistic Knowledge for Layout Understanding Tasks", ACM Jul. 2000, pp. 334-340.

Microsoft PowerPoint 2000, Copyright 1987-1999 Microsoft Corporation, referred as PowerPoint, screenshots, pp. 8-15.

Microsoft Word 2000, 1999, Microsoft Corporation, Version 9.06926 SP-3.

Lynda Hardman, et al., "Towards Multimedia on the Semantic Web," www.cwi.ni/ins2/, pp. 1-8, 2000.

* cited by examiner

TRAVERSING A HIERARCHICAL LAYOUT TEMPLATE

BACKGROUND OF THE INVENTION

The present application describes systems and techniques relating to electronic document layout, for example, traversing a hierarchical layout template.

In the publishing field, various techniques are used to improve the page layout process. Page layout involves creating a visual presentation with appropriate formatting for a document given input content for the document. For example, a FrameMaster Page is a standard HTML (Hyper Text Markup Language) file that contains code for managing control parameters of a Web page layout. Example control parameters include parameters that control screen width percentage, shape of a footnote region, resizability, and scroll bars.

Additionally, various layout templates may be created using existing software products. A layout template describes available layout structures for a page layout, such as a graphics frame that specifies where a picture goes on a page. QuarkXPress™ and InDesigne® are both example software products, available from Adobe Systems Incorporated of San Jose, Calif., that enable creation of layout templates. Typical layout templates can expect certain types of content and leave holes in the page layout if the expected content is not present.

Interscript is a specification that enables creation of flexible layout templates. The Interscript Specification was originally developed and available from Xerox Corporation of Stamford, Conn. At a first level, Interscript is a document interchange encoding that has a simple syntax and semantics that can be interpreted readily, even by low-capability editors. Interscript is a basic document description language with a small core and an extension-by-definition facility that allows creation of dynamic layout templates.

An Interscript template is an example of a hierarchical layout template that describes possible layout structures and potential aspects of a layout. The final page layout created from an Interscript template can be made to depend on the content that is poured into the template; thus, holes need not be left in the page layout when certain expected content is not present. Moreover, Interscript enables creation of hierarchical layout templates that can include features for improved layout scaling and can include layout penalties for improved layout selection (e.g., a columned document template may have a penalty on the height of the box containing the columns, thereby balancing the columns on a half-full page).

SUMMARY OF THE INVENTION

In general, in one aspect, the invention involves identifying a shared content element constraint that defines a content requirement common to all layout structures possible in a choice substructure in a hierarchical layout template, and associating the shared content element constraint with a root node of the choice substructure in the hierarchical layout template. In another aspect, the invention involves receiving content elements to be presented according to a hierarchical layout template that includes a choice substructure including a root node having a shared content element constraint that defines a content requirement common to all layout structures possible in the choice substructure, and traversing the hierarchical layout template to generate a layout structure that accommodates the content elements, said traversing including traversing the hierarchical layout template based at least in part on the shared content element constraint associated with the root node.

Advantageous implantations of the invention include one or more of the following features. Identifying the shared content element constraint can involve automatically identifying, such as in a programmable machine, one or more content constraints in one or more leaf nodes of the choice substructure in the hierarchical layout template, and discovering commonality in the one or more content constraints in the choice substructure. The invention can involve creating the hierarchical layout template, such as by creating a data structure or creating structured text-based data. The invention can involve obtaining the hierarchical layout template, such as by loading an Interscript layout template, or loading structured text-based data, and generating the hierarchical layout template from the structured text-based data.

Traversing the hierarchical layout template can involve comparing at least one of the content elements with the shared content element constraint associated with the root node to avoid traversing at least a portion of the choice substructure. Traversing the template can involve selecting among template choices in the hierarchical layout template, and generating the layout structure based on the selected template choices. Traversing the template can involve generating a preferred layout based on penalty values associated with selected layout substructures.

In another aspect, the invention features a hierarchical layout template storable on a machine-readable medium, the hierarchical layout template including template leaf nodes each having one or more content element constraints each defining for an associated leaf node a content requirement for a layout structure using the associated leaf node, and a choice substructure including a root node and at least one of the template leaf nodes as a descendent of the root node, the root node having an associated shared content element constraint that defines a content requirement common to all layout structures possible in the choice substructure. The template can include additional leaf nodes without content element constraints. The hierarchical layout template can be stored as a data structure, an Interscript layout template, and/or structured text-based data (e.g., linearized text-based tree data, (Extensible Markup Language) XML data).

The shared content element constraint can be incorporated in the root node, and the shared content element constraint can define a negative content requirement common to all layout structures possible in the choice substructure in the hierarchical layout template. The shared content element constraint can be an abstracted constraint derived from a plurality of content element constraints, and the shared content element constraint can be a complex content element constraint.

The invention can be implemented to realize one or more of the following advantages. Time performance can be improved for generation of a layout structure from a hierarchical layout template, given received content to be presented according to the hierarchical layout template. A constraint-driven backtracking search for a solution of the hierarchical layout template can be accelerated by avoiding choices that will result in dead ends due to the nature of the content being presented using the template. Traversal of the hierarchical layout template can be accelerated, and backtracking can be minimized.

The details of one or more embodiments of the invention are set forth in the accompanying drawings and the description below. Other features and advantages of the invention will become apparent form the description, the drawings, and the claims.

BRIEF DESCRIPTION OF THE DRAWINGS

Like reference symbols in the various drawings indicate like elements.

DETAILED DESCRIPTION

Figure 1:
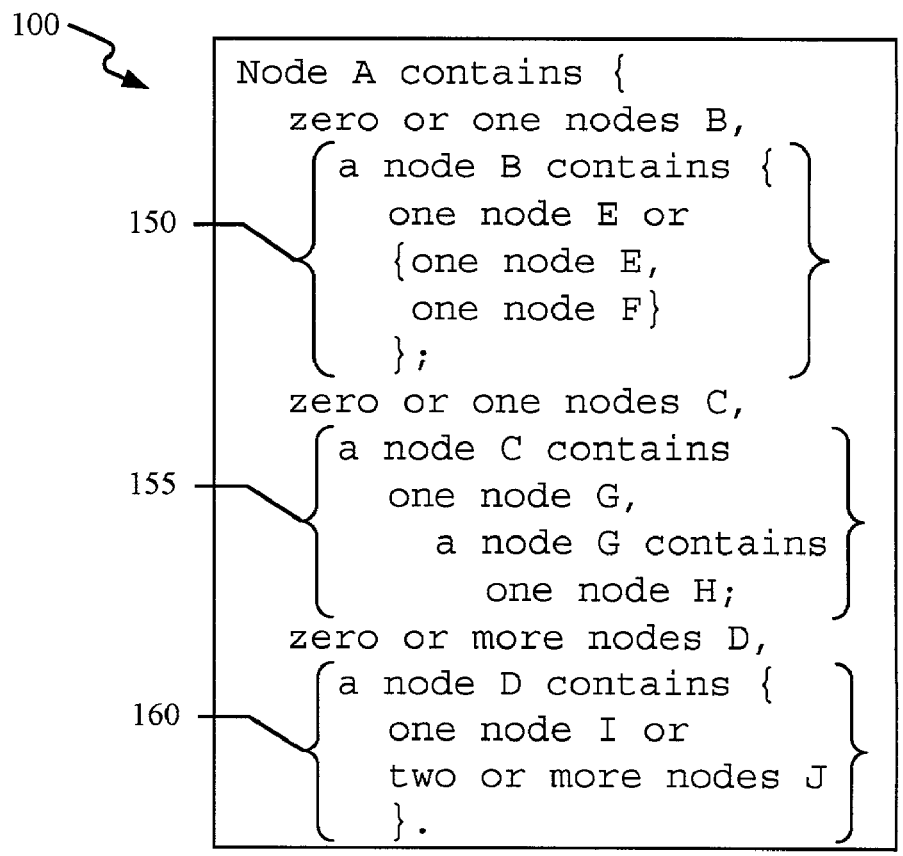
FIG. 1 shows an example hierarchical layout template.

FIG. 1 shows an example hierarchical layout template 100. The hierarchical layout template 100 includes nodes A-J arranged in a hierarchy that describes possible layout structures (e.g., a complete page layout possibility-space). Each node A-J describes a potential aspect of a layout. Thus, the nodes A-J can include page nodes, generalized container nodes, section nodes, paragraph nodes, figure nodes, table nodes, column nodes, line nodes, character nodes, and other types of nodes that can be included in an electronic document layout, including template processing control nodes.

The nodes are labeled A through J for ease of reference. In practice, the nodes in a hierarchical layout template do not require names, although frequently many of the nodes in a hierarchical layout template have explicit or implicit names. Unlike a DTD (document type definition), the hierarchy in a hierarchical layout template can be incorporated into the template itself and need not rely on naming conventions. This provides added flexibility in that nodes of the same type (e.g., figure nodes) need not have identical definitions.

Each node A-J can be defined at the same location in the template as the node itself, at another location, and/or partially at both such locations. Additionally, each node A-J can include an associated content element constraint. A content element constraint defines a piece of content, such as a figure, a photograph or a hyperlink, that is required by the associated node.

The hierarchical layout template 100 is an electronic document that can be used to generate a layout structure to format content to produce another electronic document (e.g., a work processing document, a Web page document, or a final format document) that marries layout and content. As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

A final format document generally provides a device-independent format for publishing and/or distributing electronic documents. Thus, a final format document is conventionally a file that lies between a layout program and the typical raster image processors, which drive traditional printing apparatus. An example of a final format is the Portable Document Format (PDF) available from Adobe Systems Incorporated of San Jose, Calif. Example software for creating and reading PDF documents is the Acrobat® software, also of Adobe Systems Incorporated. The Adobe® Acrobat® software is based on the Adobe® PostScript® technology which descries formatted pages of a document in a device-independent fashion.

The hierarchical layout template 100 can be stored in many different forms and formats and can conform to various layout template standards. The hierarchical layout template 100 can be stored as a data structure (e.g., a tree data structure), and/or as a structured text-based document. The hierarchical layout template 100 can be text-based linearized tree data, such as XML data. The hierarchical layout template 100 can be an Interscript document. Interscript is a public-domain standard defining a digital representation of editable documents. As used herein, the term "text" means character data encoded using any standardized character encoding scheme, such as Unicode or ASCII (American Standard Code for Information Interchange).

Figure 2:
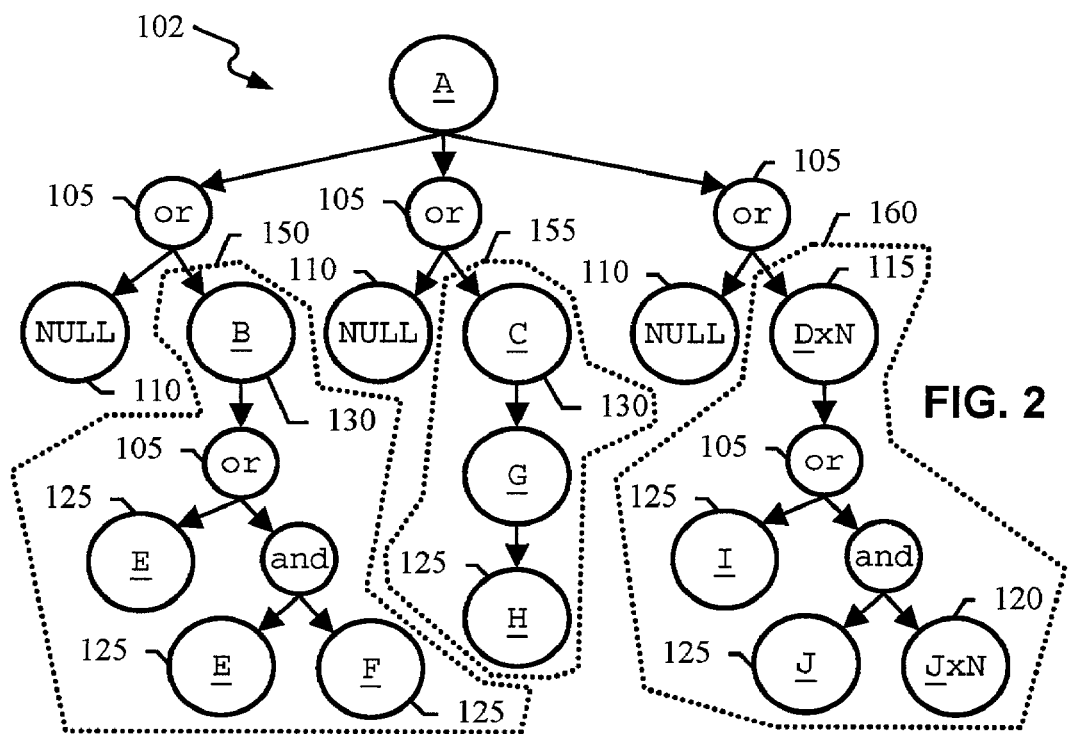
FIG. 2 shows an example data structure for a hierarchical layout template.

FIG. 2 shows an example data structure 102 for the hierarchical layout template of FIG. 1. The example data structure 102 is a tree data structure where choices in the hierarchical layout template have been converted into corresponding choice nodes 105, NULL nodes 110 and expandable nodes 115, 120 (e.g., a JxN node represents one or more J nodes). Other structures are also possible. Leaf nodes 120, 125 can each include a content element constraint, as in a typical hierarchical layout template. In addition, non-leaf nodes 115, 130 can each include a shared content element constraint.

A shared content element constraint defines a content requirement common to all layout structures possible in a choice substructure in a hierarchical layout template. A content element constraint can be a plural constraint (e.g., three separate pieces of content are each required). For example, if node E has two content requirements (e.g., a figure and a caption), node E has a plural content element constraint. Likewise, the node B can have a plural shared content element constraint because a choice substructure 150, of which node B is the root, has the plural content element constraint from node E common to all possible layout structures. Any layout structures that includes a node B will also include a node E because of the structure of the hierarchical layout template.

A shared content element constraint defines a content requirement common to all layout structures possible in a choice substructure. The content requirement can be singular, plural or complex. A shared content element constraint can be a content constraint promoted from one of the leaf nodes (e.g., a single content constraint identified in a single leaf node), and/or an abstracted constraint derived from one or more content constraints found in the leaf nodes. Identifying a common content requirement can be performed by a person or by a machine. A person can identify such constraint commonality while constructing a hierarchical layout template or when analyzing an existing hierarchical layout template. A machine can identify common content element constraints in an existing hierarchical layout template as part of an automated process.

This identification process can involve, for each leaf node in a hierarchical layout template, identifying any content element constraints, and then propagating those content element constraints back up the tree until no more commonality can be found. For example, if node E includes a content constraint (e.g., a figure is required) and node F includes another content constraint (e.g., a caption is required), the choice substructure 150 includes a common content constraint, which is the content constraint from node E (e.g., a figure is required). This common content constraint can be stored as a shared content element constraint in node B. If node H includes a content constraint, a choice substructure 155 includes this common content constraint, which can be stored as a shared content element constraint in node C.

Moreover, a shared content element constraint can be complex (e.g., the commonality among layout structures can include alternative constraints). For example, if node I includes a content constraint (alpha) and node J includes a content constraint (beta), node 115 can have a complex shared content element constraint (for each node D, one alpha or at least two betas) associated with the root node 115 of a choice substructure 160.

Figure 3:
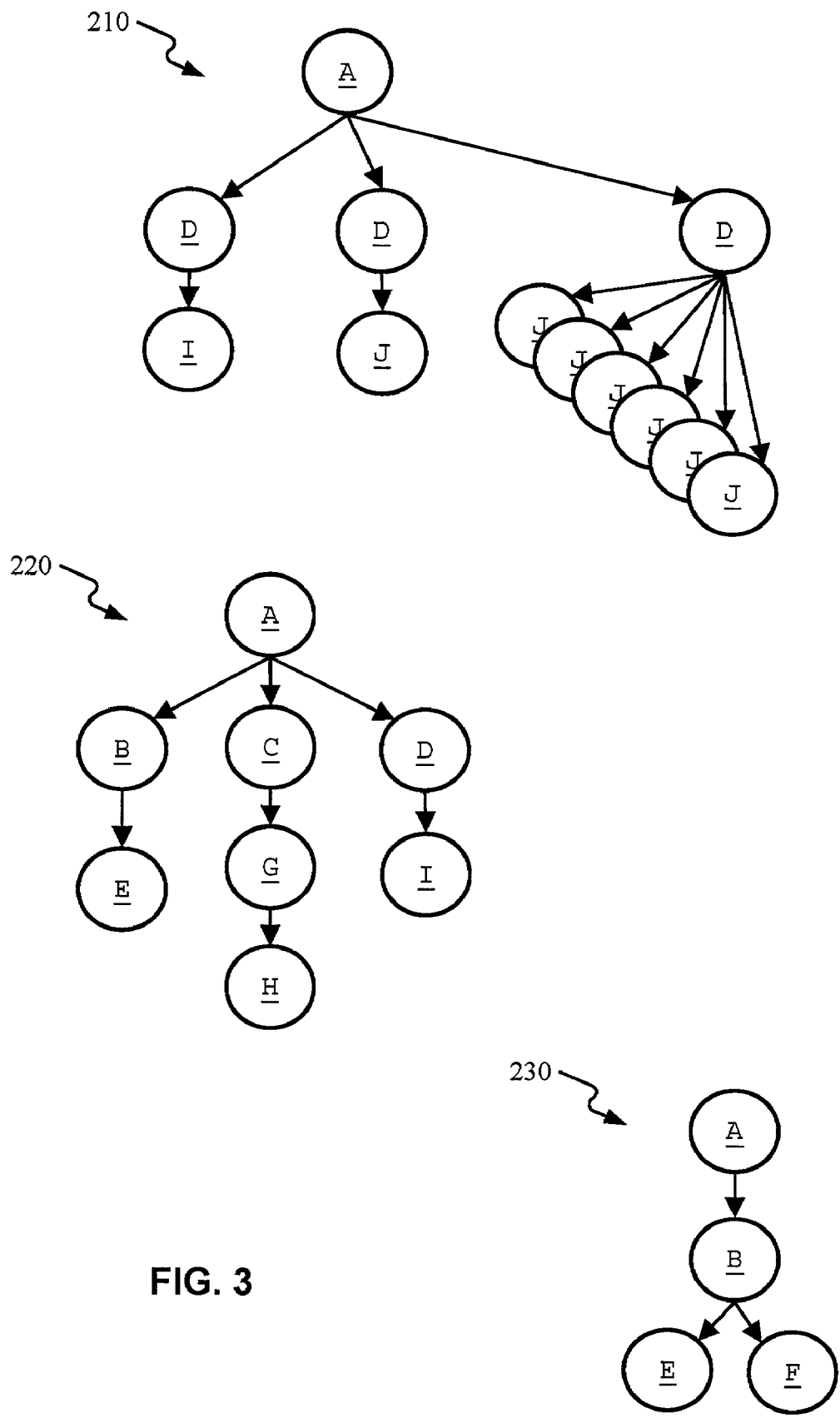
FIG. 3 shows three layout structures taken from the potential layout structures of the hierarchical layout template of FIG. 1.

Although FIG. 2 illustrates a hierarchical layout template in the form of a tree, the hierarchical layout template is not a typical tree in that multiple alternative trees are represented by the template tree; the choices in the template have not been made. The hierarchical layout template represents all possible layout structures, and a resulting layout structure is produced by selecting nodes from the hierarchical layout template. Thus, a resulting layout structure can also be a tree. FIG. 3 shows three layout structures 210, 220, 230 derived from the potential layout structures of the hierarchical layout template of FIG. 1. As can be seen in FIGS. 2 and 3, the choice substructure can be either wide or narrow and still benefit from a shared content element constraint placed at its root.

With shared content element constraints in place in the hierarchical layout template, generation of a layout structure from the template can be improved. During traversal of the hierarchical layout template, backtracking can be minimized. A constraint-driven backtracking search for a solution of the hierarchical layout template can be accelerated by avoiding decisions that will result in dead ends due to the nature of the content being poured into the template. The layout structure that results from pouring the content into the template can be generated more quickly by comparing elements of the poured content with shared content element constraint(s) at non-leaf node(s) in the hierarchical layout template.

Figure 4:
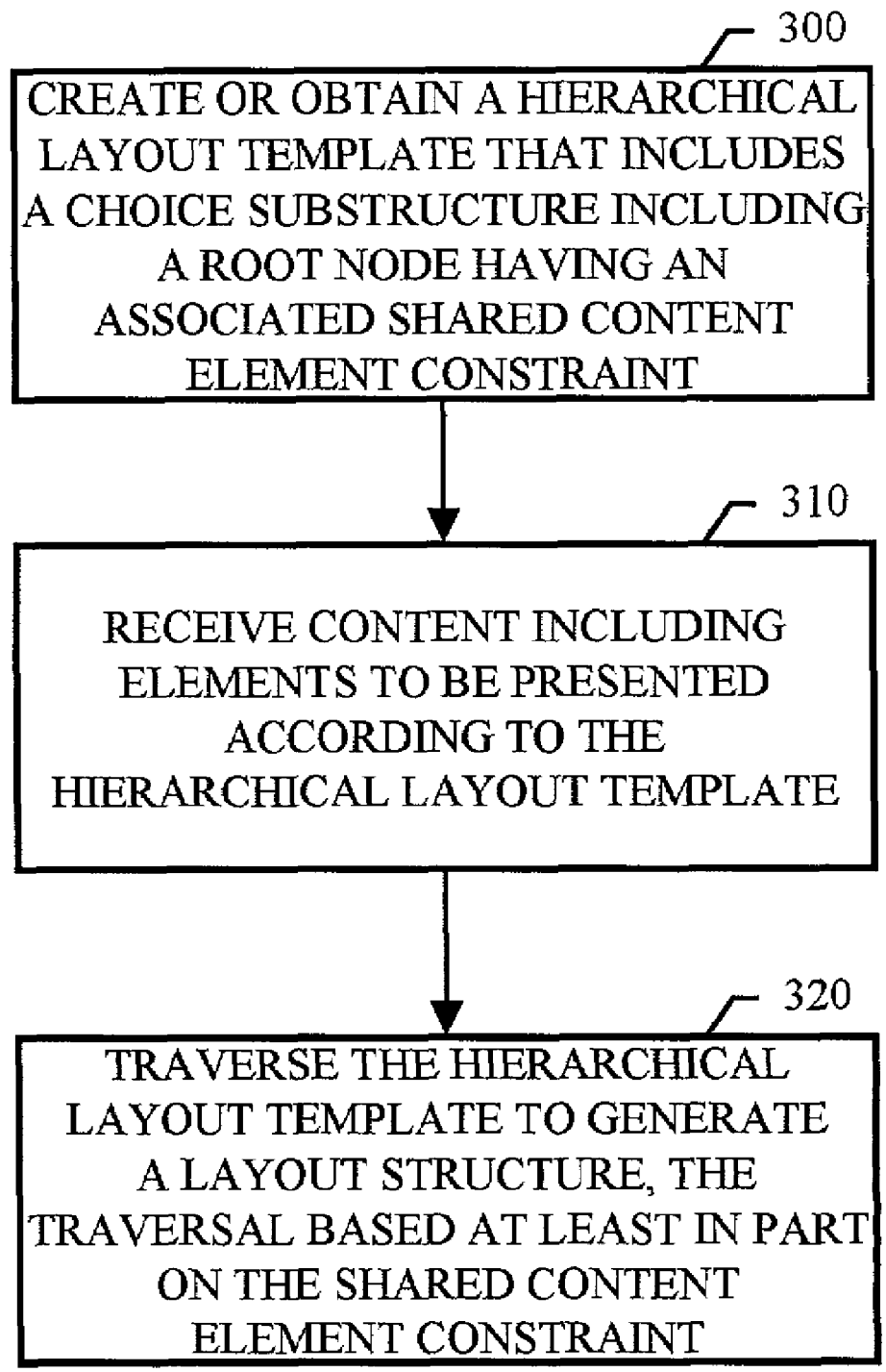
FIG. 4 is a flow chart illustrating creation of a layout structure for content using a hierarchical layout template and a shared content element constraint.

FIG. 4 is a flow chart illustrating generation of a layout structure for content using a hierarchical layout template and a shared content element constraint. The hierarchical layout template can be structured text-based data (e.g., XML data), a data structure, and/or Interscript data. The hierarchical layout template includes a choice substructure including a root node having an associated shared content element constraint. The shared content element constraint can be a single constraint, a plural constraint, a complex constraint, or a negative constraint (e.g., absence of a particular content element is required).

The hierarchical layout template is either created or obtained at 300. Content is received at 310. The content includes content elements to be presented according to the hierarchical layout template. The hierarchical layout template is traversed to generate a layout structure that accommodates the content elements at 320. Traversal of the hierarchical layout template is based at least in part on the shared content element constraint.

Comparing the received content elements with the shared content element constraint during traversal of the hierarchical layout template allows traversal of the choice substructure to be skipped when the content requirements for that choice substructure are not in place. This can reduce the amount of time needed to traverse the hierarchical layout template since backtracking caused by poor template choices can be minimized. Thus, a constraint-driven backtracking search for a solution of a hierarchical layout template can be accelerated.

Figure 5:
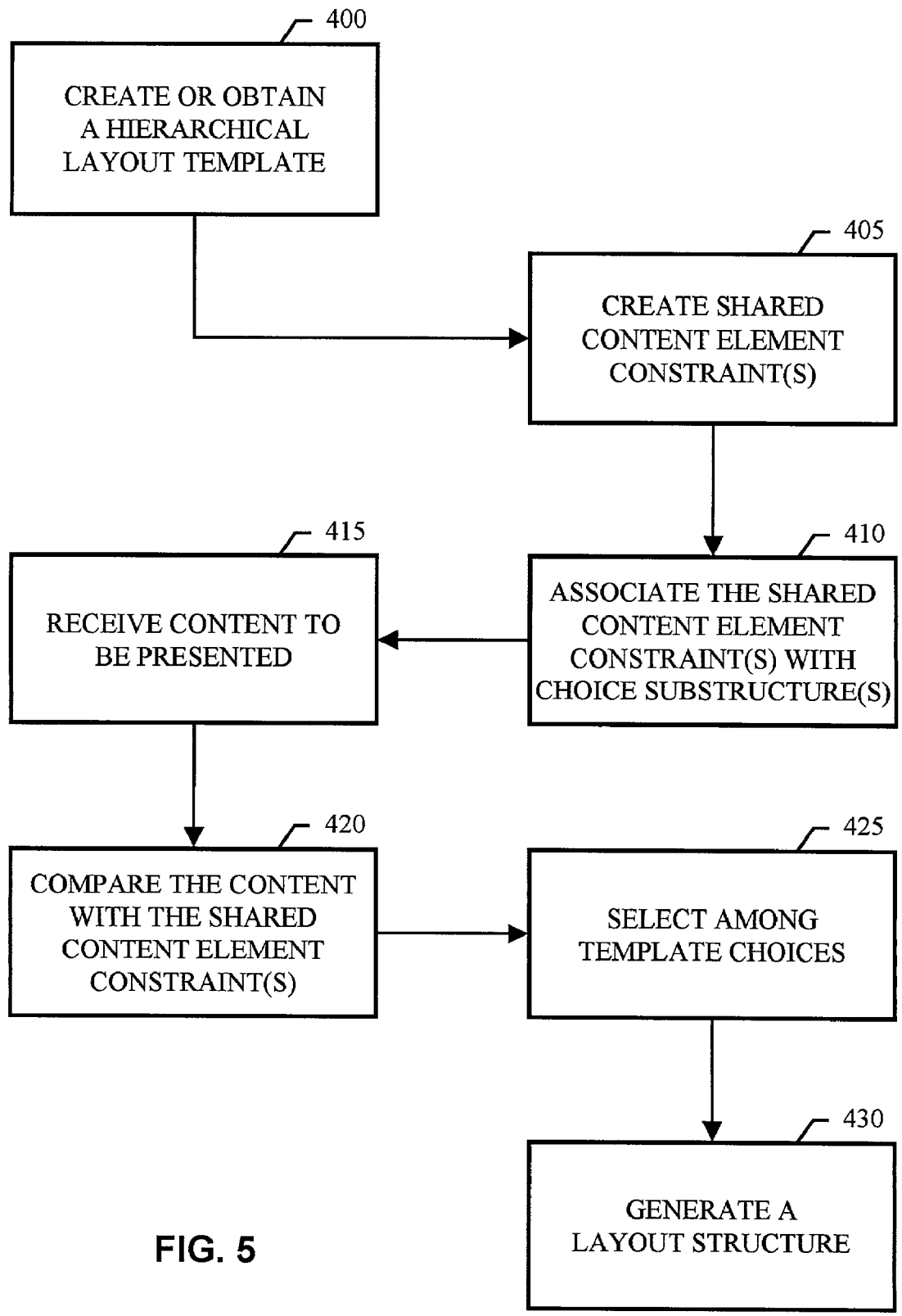
FIG. 5 is a flow chart illustrating creation of a shared content element constraint in a hierarchical layout template and creation of a layout structure for content using the hierarchical layout template and the shared content element constraint.

FIG. 5 is a flow chart illustrating creation of a shared content element constraint in a hierarchical layout template and generation of a layout structure for content using the hierarchical layout template and the shared content element constraint. A hierarchical layout template is created or obtained at 400. The hierarchical layout template can have one or more different formats and can conform to various layout template standards as described above. The hierarchical layout template can be obtained, such as by loading a data structure, loading an Interscript layout template, and/or loading structured text-based data and generating the hierarchical layout template from the structured text-based data.

The hierarchical layout template can be created by a programmable machine and/or by a person. For example, the hierarchical layout template can be created by a programmable machine, using the techniques described below, as a person supplies data defining the layout template. This supplied data can be text data, such as "{up to N lines, then photo; up to N lines}", which can be used, with an additional constraint on height, to express a choice for placing a photo in a column layout where the photo, if present, should be at the bottom.

One or more shared content element constraints are created at 405. The shared content element constraint(s) can be created by a person, by a programmable machine operating on an existing hierarchical layout template, or by a programmable machine operating on data supplied by a person. For example, a programmable machine can identify one or more content constraints in one or more leaf nodes of the hierarchical layout template as it is being created, and commonality in the identified content constraint(s) can be discovered in a choice substructure to create a shared content element constraint for the choice substructure. In the column layout example mentioned above, the "up to N lines, then photo" is shorthand for a sequence of choices {0 lines, then photo; 1 line, then photo; 2 lines then photo; . . . ; N lines then photo}. A programmable machine can create a shared content element constraint for the choice substructure corresponding to the {up to N lines, then photo}, where the shared content element constraint indicates that following this choice path requires a photo.

In an Interscript implementation, content constrains that are traditionally only associated with a mold node can be associated with choice nodes that are higher in the hierarchical layout template. The procedure(s) that allow content (e.g., a store) to be poured into the hierarchical layout template can be modified to check for content constraints at choice nodes, and to skip over potential template choices with content constraints that cannot be satisfied given available content.

The shared content element constraint(s) are associated with appropriate choice substructures at 410. For example, a shared content element constraint can be added to a root node of a choice substructure. Alternatively, an additional choice node can be added to the hierarchical layout template to store the shared content element constraint. The hierarchical layout template, with associated shared content element constraint (s), can be used immediately or stored for later use.

Content to be presented according to the hierarchical layout template, with associated shared content element constraint(s), is received at 415. The hierarchical layout template is traversed to generate a layout structure that accommodates the content elements. This traversal includes comparing the received content with the shared content element constraint (s) at 420, selecting among template choices at 425, and constructing a layout structure at 430. Comparing the content elements with the shared content element constraint(s) allows a programmable machine to avoid traversing at least a portion of a choice substructure in the hierarchical layout template when content requirements are not met. Thus, this comparing can affect the selection of template choices from the hierarchical layout template.

Constructing the layout structure can involve determining a preferred layout based on penalty values associated with selected layout substructures. Thus, multiple template choices can be selected based on the received content elements and the shared content element constraint(s), and these selected template choices can be compared to determine a preferred layout structure.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A method comprising:
   identifying a shared content element constraint that defines a content requirement common to all layout structures possible in a choice substructure in a hierarchical layout template; and
   associating the shared content element constraint with a root node of the choice substructure in the hierarchical layout template;
   wherein the content requirement common to all layout structures possible in the choice substructure corresponds to input content required by a node of the hierarchical layout template during generation of a page layout structure to format content to produce a document that combines layout and content; the method further comprising:
   receiving content elements to be presented according to the layout template; and
   traversing the layout template to generate a layout structure that accommodates the content elements, said traversing including traversing the hierarchical layout template based at least in part on the shared content element constraint associated with the root node;
   wherein said traversing the hierarchical layout template comprises generating a preferred layout based on penalty values associated with selected layout substructures.

2. The method of claim 1, wherein said identifying the shared content element constraint comprises:
   in a programmable machine, identifying one or more content constraints in one or more leaf nodes of the choice substructure in the hierarchical layout template; and
   in a programmable machine, discovering commonality in the one or more content constraints in the choice substructure.

3. The method of claim 2, wherein said identifying the one or more content constraints comprises identifying a single content constraint in a single leaf node.

4. The method of claim 1, further comprising creating the hierarchical layout template.

5. The method of claim 4, wherein said creating the hierarchical layout template comprises creating a data structure.

6. The method of claim 4, wherein said creating the hierarchical layout template comprises creating structured text-based data.

7. The method of claim 1, wherein said traversing the hierarchical layout template comprises comparing at least one of the content elements with the shared content element constraint associated with the root node to avoid traversing at least a portion of the choice substructure.

8. The method of claim 1, wherein said traversing the hierarchical layout template comprises:
   selecting among template choices in the hierarchical layout template; and
   generating the layout structure based on the selected template choices.

9. A software product tangibly stored on a machine-readable medium, the software product comprising instructions operable to cause one or more programmable processors to perform operations comprising:
   identifying a shared content element constraint that defines a content requirement common to all layout structures possible in a choice substructure in a hierarchical layout template; and
   associating the shared content element constraint with a root node of the choice substructure in the hierarchical layout template;
   wherein the content requirement common to all layout structures possible in the choice substructure corresponds to input content required by a node of the hierarchical layout template during generation of a page layout structure to format content to produce a document that combines layout and content; wherein the operations further comprise:
   receiving content elements to be presented according to the hierarchical layout template; and
   traversing the hierarchical layout template to generate a layout structure that accommodates the content elements, said traversing including traversing the hierarchical layout template based at least in part on the shared content element constraint associated with the root node;

wherein said traversing the hierarchical layout template comprises generating a preferred layout based on penalty values associated with selected layout substructures.

10. The software product of claim 9, wherein said identifying the shared content element constraint comprises:

identifying one or more content constraints in one or more leaf nodes of the choice substructure in the hierarchical layout template; and discovering commonality in the one or more content constraints in the choice substructure.

11. The software product of claim 9, wherein the operations further comprise creating the hierarchical layout template.

12. The software product of claim 11, wherein said creating the hierarchical layout template comprises creating structured text-based data.

13. The software product of claim 9, wherein said traversing the hierarchical layout template comprises comparing at least one of the content elements with the shared content element constraint associated with the root node to avoid traversing at least a portion of the choice substructure.

14. A method comprising:

receiving content elements to be presented according to a hierarchical layout template that includes a choice substructure including a root node having shared content element constraint that defines a content requirement common to all layout structures possible in the choice substructure; and traversing the hierarchical layout template to generate a layout structure that accommodates the content elements, said traversing including traversing the hierarchical layout template based at least in part on the shared content element constraint associated with the root node;

wherein the content requirement common to all layout structures possible in the choice substructure corresponds to input content required by a node of the hierarchical layout template during generation of a page layout structure to format content to produce a document that combines layout and content; wherein said traversing the hierarchical layout template comprises comparing at least one of the content elements with the shared content element constraint associated with the root node to avoid traversing at least a portion of the choice substructure; and wherein said traversing the hierarchical layout template comprises determining a preferred layout based on penalty values associated with selected layout substructures.

15. The method of claim 14, wherein said traversing the hierarchical layout template comprises:

selecting among template choices in the hierarchical layout template; and generating the layout structure based on the selected template choices.

16. The method of claim 14, further comprising obtaining the hierarchical layout template.

17. The method of claim 16, wherein said obtaining the hierarchical layout template comprises loading an Interscript layout template.

18. The method of claim 16, wherein said obtaining the hierarchical layout template comprises:

loading structured text-based data; and generating the hierarchical layout template from the structured text-based data.

19. A software product tangibly stored on a machine-readable medium, the software product comprising instructions operable to cause one or more programmable processors to perform operations comprising:

receiving content elements to be presented according to a hierarchical layout template that includes a choice substructure including a root node having a shared content element constraint that defines a content requirement common to all layout structures possible in the choice substructure; and traversing the hierarchical layout template to generate a layout structure that accommodates the content elements, said traversing including traversing the hierarchical layout template based at least in part on the shared content element constraint associated with the root node;

wherein the content requirement common to all layout structures possible in the choice substructure corresponds to input content required by a node of the hierarchical layout template during generation of a page layout structure to format content to produce a document that combines layout and content; wherein said traversing the hierarchical layout template comprises comparing at least one of the content elements with the shared content element constraint associated with the root node to avoid traversing at least a portion of the choice substructure; and wherein said traversing the hierarchical layout template comprises determining a preferred layout based on penalty values associated with selected layout substructures.

20. The software product of claim 19, wherein said traversing the hierarchical layout template further comprises:

selecting among template choices in the hierarchical layout template based on said comparing; and generating the layout structure based on the selected template choices.

21. The software product of claim 19, wherein the operations further comprise obtaining the hierarchical layout template.

22. The software product of claim 21, wherein said obtaining the hierarchical layout template comprises:

loading structured text-based data; and generating the hierarchical layout template from the structured text-based data.

23. A hierarchical layout template storable on a machine-readable medium, the hierarchical layout template comprising:

template leaf nodes each having one or more content element constrains each defining for an associated leaf node a content requirement for a layout structure using the associated leaf node; and a choice substructure including a root node and at least one of the template leaf nodes as a descendent of the root node, the root node having an associated shared content element constraint that defines a content requirement common to all layout structures possible in the choice substructure;

wherein the content requirement common to all layout structures possible in the choice substructure corresponds to input content required by a node of the hierarchical layout template during generation of a page layout structure to format content to produce a document that combines layout and content; wherein the hierarchical layout template is arranged to support traversing the hierarchical layout template comprising: comparing at least one of content element with the shared content element constraint associated with the root node to avoid traversing at least a portion of the choice substructure, and determining a preferred layout based on penalty values associated with selected layout substructures.

24. The hierarchical layout template of claim 23, further comprising additional leaf nodes without content element constraints.

25. The hierarchical layout template of claim 23, wherein the shared content element constrain is incorporated in the root node.

26. The hierarchical layout template of claim 23, wherein the shared content element constraint defines a negative content requirement common to all layout structures possible in the choice substructure in the hierarchical layout template.

27. The hierarchical layout template of claim 23, wherein the shared content element constraint comprises an abstracted constraint derived from a plurality of content element constraints.

28. The hierarchical layout template of claim 27, wherein the shared content element constraint comprises a complex content element constraint.

29. The hierarchical layout template of claim 23, wherein the template leaf nodes and the choice substructure form at least a portion of a data structure.

30. The hierarchical layout template of claim 23, wherein the template leaf nodes and the choice substructure form at least a portion of an Interscript layout template.

31. The hierarchical layout template of claim 23, wherein the template leaf nodes and the choice substructure form at least a portion of structured text-based data.

32. The hierarchical layout template of claim 31, wherein the structured text-based data comprises linearized text-based tree data.

33. The hierarchical layout template of claim 32, wherein the linearized text-based tree data comprises XML data.

* * * * *

UNITED STATES PATENT AND TRADEMARK OFFICE
CERTIFICATE OF CORRECTION

PATENT NO.         : 7,415,452 B1
APPLICATION NO.   : 10/177576
DATED              : August 19, 2008
INVENTOR(S)        : Robert M. Ayers Page 1 of 1

It is certified that error appears in the above-identified patent and that said Letters Patent is hereby corrected as shown below:

On the title page,

[*] Notice:    Subject to any disclaimer, the term of this patent is extended or adjusted under 35 USC 154(b) by (970) days Delete the phrase "by 970 days" and insert -- by 1100 days --

Signed and Sealed this

Tenth Day of March, 2009

JOHN DOLL
*Acting Director of the United States Patent and Trademark Office*